(No Model.) 2 Sheets—Sheet 1.
O. B. PECK.
CENTRIFUGAL ORE SEPARATOR.
No. 485,475. Patented Nov. 1, 1892.
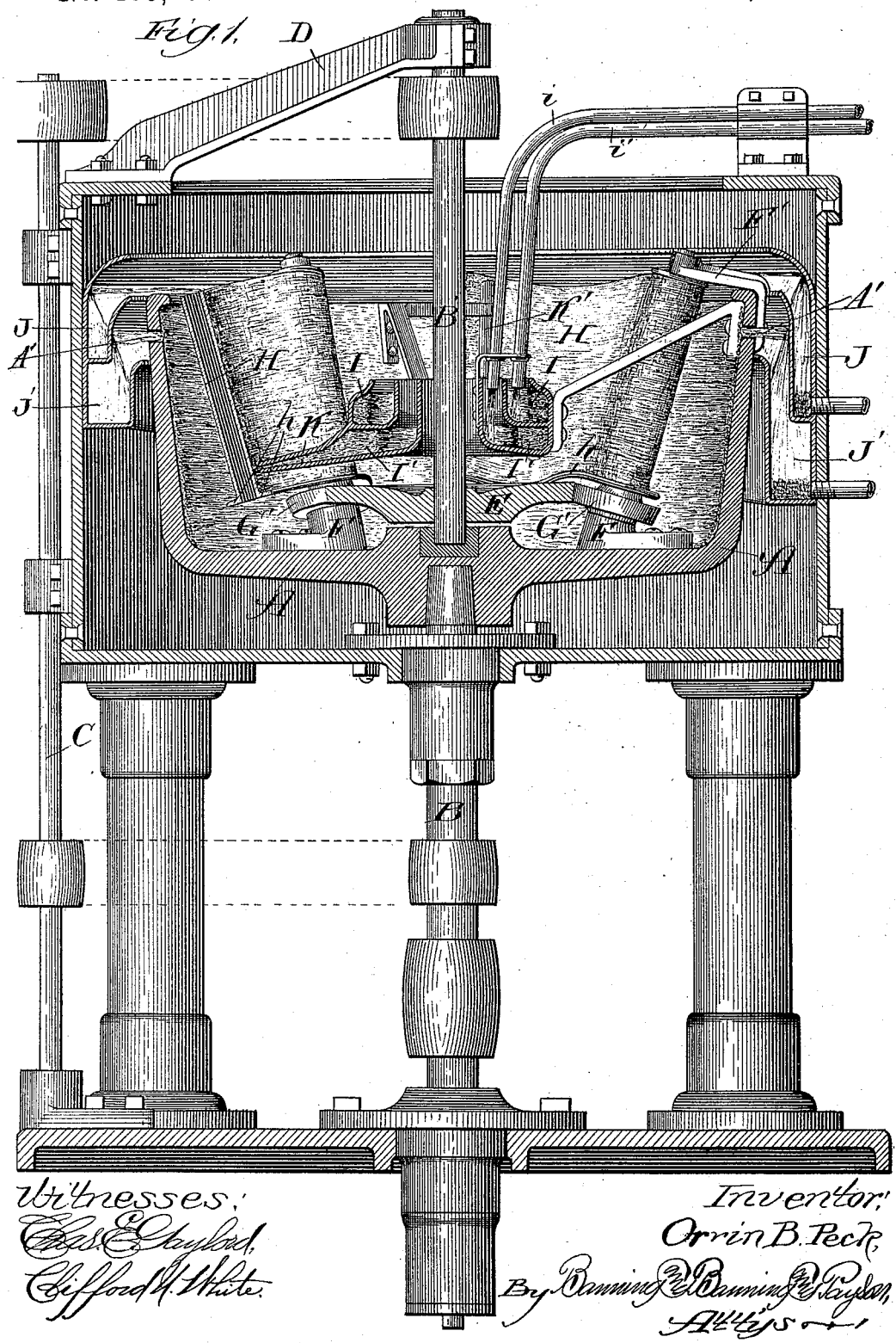

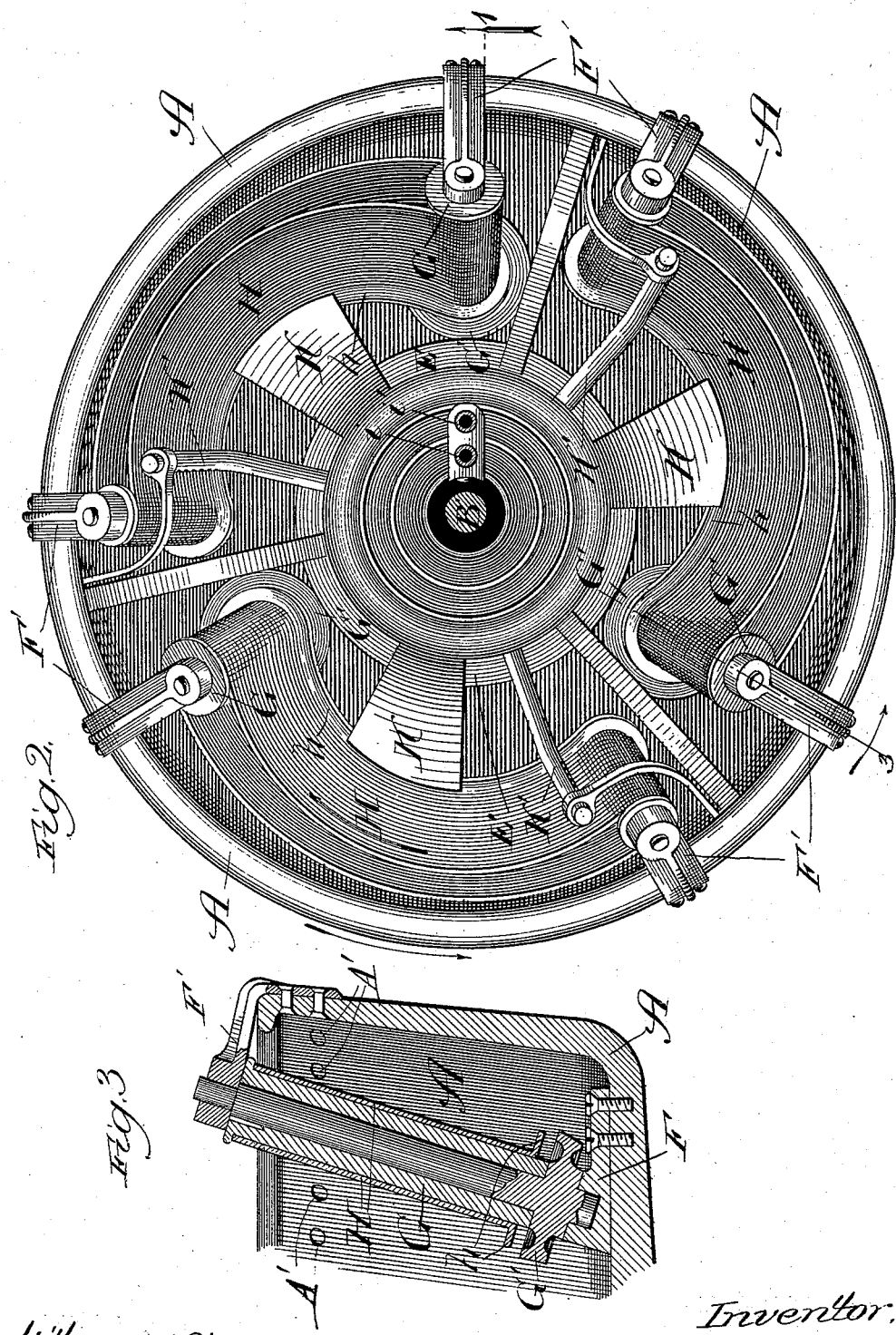

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 485,475, dated November 1, 1892.

Application filed January 11, 1892. Serial No. 417,690. (No model.)

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

In the drawings, Figure 1 is a vertical section taken in the line 1 of Fig. 2, looking in the direction of the arrow. Fig. 2 is a sectional plan view of the apparatus with the top removed, and Fig. 3 is a vertical section of a portion of the treatment-vessel.

In making my improved apparatus for separating powdered or finely-divided particles containing mineral-bearing substances of different degrees of specific gravity I make a rotatable vessel A, mounted on and rotated by a shaft B, supported and rotated in any suitable manner. Preferably at the side of the apparatus I arrange a counter-shaft C, which may be rotated by a belt connecting it with the shaft B. At the top of the apparatus and supported in any suitable manner is a bracket D, extending over the apparatus to its central portion to afford a bearing for a shaft B', which extends down into the treatment-vessel and rests in a suitable step at the bottom. This shaft may be connected to the counter-shaft by a belt, so as to be rotated by it. At or near the bottom of the shaft B' and within the treatment-vessel is arranged a friction plate or disk E, which is fixed to the shaft, so as to be rotated by it. In the bottom of the treatment-vessel are arranged a number of brackets F, affording bearings for a number of rollers G. These rollers are arranged at an inclination from the vertical, so that they incline outward at the tops, where they are supported in brackets F'. At the lower ends of the rollers G are arranged disks or friction-wheels G', which engage with the disk E, as shown in Figs. 1 and 2, so as to be rotated by a frictional contact with the same. I have shown six of these rollers in the apparatus illustrated in the drawings, and I have arranged on them belts or canvases H, made of any suitable material, which pass around the rollers and are caused to travel by their rotation. These belts are preferably provided at their bottoms with outwardly-extending flanges $h$. Within the treatment-vessel and preferably surrounding the shaft B' is arranged a receiving-bowl divided into two compartments I and I', and leading to them, respectively, from the outside are arranged a material-supply pipe $i$ and a water-supply pipe $i'$. The material introduced through the material-pipe is deposited in the compartment I' of the receiving-bowl and the water introduced through the pipe $i'$ is deposited in the compartment I. The compartment I' is provided with spouts K and the compartment I is provided with spray-pipes K' to permit the material and the water to be delivered to the belts, the spray-pipes distributing the water across the belt in gentle streams or sprays. As the material and water are introduced, they are forced out of the receiving-bowl against the belts or canvases, up which they are driven by the action of centrifugal force, the lighter particles and water being thrown over the top into a curbing or receptacle J, whence they may be carried away as desired. Owing to the outward inclination of the belts, the lighter particles and water pass clear of the outer portion of the belt as they are forced into the curbing or receptacle intended for them. The heavier particles, adhering to the surface of the belt, are carried along by the travel of the belt, and as they pass around the rollers they are thrown off by the action of centrifugal force against the side of the receiving-vessel, up which they pass and out through perforations or openings A' and are deposited in a curbing or receptacle J', whence they are carried off to a suitable place of deposit.

In another application, Serial No. 390,332, filed by me April 24, 1891, I have described, broadly, belts which simultaneously travel and rotate. In this case, however, there are specific differences from the arrangement of the belts in my other case. In this each roller for a belt has its lower end closer to the axis of the vessel in which it is arranged than its upper end. The belts partially surround the axis of the vessel in which they are arranged, approximating the arc of the circle described by their rotation, with one end of each belt somewhat nearer the axis of the vessel than the other, and the side of the belt next to the axis of the vessel travels toward the roller nearest such axis.

What I regard as new, and desire to secure in this application, is—

1. In an apparatus for separating powdered or finely-divided particles containing mineral-bearing substances of different degrees of specific gravity, the combination of a rotatable vessel, rotatable rollers arranged within such vessel, having their lower ends nearer to its axis of rotation than their upper, belts or canvases arranged on such rollers and caused to travel by their rotation, and means for rotating the vessel and the rollers, substantially as described.

2. In an apparatus for separating powdered or finely-divided particles containing mineral-bearing substances of different degrees of specific gravity, the combination of a rotatable vessel, rotatable rollers arranged within such vessel, having their lower ends nearer to its axis of rotation than their upper, belts or canvases arranged on such rollers, means for supplying material and water to the surface of such belts or canvases, and means for rotating the vessel and the rollers, substantially as described.

3. In centrifugal ore-separators, one or more belts having simultaneously traveling and rotary motions and forming, approximately, the arc of the circle described by their rotation, substantially as described.

4. In centrifugal ore-separators, one or more belts having simultaneously traveling and rotary motions and each forming, approximately, the arc of the circle described by their rotation and mounted on rollers having their lower ends nearer the axis of rotation than their upper, substantially as described.

ORRIN B. PECK.

Witnesses:
THOMAS A. BANNING,
MARIE L. PRICE.